United States Patent
Yu et al.

(10) Patent No.: US 11,904,519 B2
(45) Date of Patent: Feb. 20, 2024

(54) EXTRUSION EQUIPMENT

(71) Applicant: Plastics Industry Development Center, Taichung (TW)

(72) Inventors: Chia-Yu Yu, Taichung (TW); Li-Kai Lin, Taichung (TW); Chia-Hsin Tung, Taichung (TW); Wei-Cheng Chen, Taichung (TW)

(73) Assignee: Plastics Industry Development Center, Taichung (TW)

( * ) Notice: Subject to any disclaimer, the term of this patent is extended or adjusted under 35 U.S.C. 154(b) by 79 days.

(21) Appl. No.: 17/715,244

(22) Filed: Apr. 7, 2022

(65) Prior Publication Data

US 2023/0191681 A1 Jun. 22, 2023

(30) Foreign Application Priority Data

Dec. 20, 2021 (TW) .................................. 110147696

(51) Int. Cl.
| | |
|---|---|
| *B29C 70/52* | (2006.01) |
| *B29C 48/285* | (2019.01) |
| *B29C 48/685* | (2019.01) |
| *B29C 48/80* | (2019.01) |

(52) U.S. Cl.
CPC ........ *B29C 48/2886* (2019.02); *B29C 48/685* (2019.02); *B29C 48/802* (2019.02)

(58) Field of Classification Search
CPC ... B29C 70/526; B29C 70/524; B29C 70/523; B29C 70/522; B29C 70/52; B29C 48/802; B29C 48/288

See application file for complete search history.

(56) References Cited

U.S. PATENT DOCUMENTS

| | | | | | |
|---|---|---|---|---|---|
| 5,073,413 | A | * | 12/1991 | Koppernaes | .......... B29B 15/122 427/294 |
| 5,879,602 | A | * | 3/1999 | Scheuring | ................. B29B 7/90 425/114 |

OTHER PUBLICATIONS

Arrabiyeh, P.A., D. May, M. Eckrich, A.M. Dlugaj, An overview on current manufacturing technologies: Processing continuous rovings impregnated with thermoset resin, Polymer Composites, vol. 42 (Aug. 2021), pp. 5630-5655. (Year: 2021).*

* cited by examiner

*Primary Examiner* — Matthew J Daniels
(74) *Attorney, Agent, or Firm* — Best & Flanagan LLP (57) ABSTRACT

Present invention is related to an extrusion equipment for processing a fibre composite. The extrusion equipment comprises a decompression and a melt tank arranged and operated vertically along with the direction of gravity. The melt tank comprises a melt tank impregnation section and a melt tank control section with a melt tank cavity as a channel condition defined within. The channel has its inner diameter or passage gradually decreased from top to bottom. The extrusion equipment provided by the present invention is configured in the direction of gravity for processing the melted thermoplastic resin and the fibre vertically for avoiding fibre fracture or breakage and improving the quality of the final products. As the melted plastic is processed vertically along with the gravity, the melted plastic could transfer or pass through the channel quickly without resulting decomposition due to the high heat and the long retention time in the cavity.

10 Claims, 11 Drawing Sheets

EXTRUSION EQUIPMENT

FIELD OF INVENTION

The present invention provides an extrusion equipment, especially an extrusion equipment that utilizes gravity to improve resin dispersion for producing fibre prepreg material.

BACKGROUND OF THE INVENTION

Engineering plastics such as thermoplastic resins have many advantages of reasonable price and remarkable recyclable abilities. The thermoplastic resins have a wide range of applications including military uses, medical field and all kinds of electronic products. To further increase a mechanical strength of the thermoplastic resin, a composite material incorporating thermoplastic resins and inorganic fibre has made such thermoplastic composite material became one of the key projects developed in recent years.

Taking continuous inorganic fibre as an example using by the thermoplastic composite material, the continuous inorganic fibre is impregnated in the thermoplastic resin as a prepreg material for further shaping and forming into products. To be specific, the continuous inorganic fibre is firstly in a form of fibre bundle which need to be dispersed and spread into a sheet and then impregnated with the thermoplastic resin using impregnation equipment.

However, the conventional impregnation equipment is usually deposited in a horizontal direction along with ground allowing heated and melted thermoplastic resin traveling through the impregnation equipment and impregnating the continuous inorganic fibre. This horizontally set-up making high viscosity of the heated and melted thermoplastic resin travels through the impregnation equipment becomes so difficult and to evenly impregnate the continuous inorganic fibre becomes so hard to achieve.

Hence, to evenly distribute the thermoplastic resin on the spread inorganic fibre sheet is a critical problem to be solved. Also, maintaining the thermoplastic resin at high heat in the impregnation equipment could easy cause decomposition of such resin. How to remove or evacuate a large amount of processed thermoplastic resin in the equipment is a big challenge for the manufacture.

Hence, it is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to improve the aforementioned problems of uneven distribution and difficulty in evacuate the thermoplastic resin that caused by the conventional impregnation equipment, the present invention provides an extrusion equipment for processing a fibre composite. The said extrusion equipment for processing a fibre, comprising a decompression section and a melt tank arranged in a vertical direction along with gravity, wherein: the decompression section comprises a decompression section feeding port at top and a decompression section discharging port on a bottom; a decompression cavity is defined between the decompression feeding port and the decompression section discharging port; the decompression cavity is connected with a vacuum device; at least a pair of soft rubber wheels is provided at an opening of the decompression section feeding port; the melt tank is following connected below the decompression discharging port of the decompression section; the melt tank includes a melt tank fibre feeding port, a melt tank resin feeding port, a melt tank impregnation section, a melt tank control section, a melt tank fibre discharging port, and a melt tank cavity defined by all the aforementioned components; wherein: the melt tank fibre feeding port is followed with the decompression section discharge port at bottom; the melt tank resin feeding port is arranged at a lateral portion of the melt tank cavity as an opening and is located below the melt tank fibre feeding port above the melt tank impregnation section; a thermoplastic resin is fed into the melt tank via melt tank resin feeding port; the melt tank impregnation section includes an impregnation section channel extending in a vertical direction arranging with two sides of concaved curvy surfaces or multiple protruded bulks; all tips of the concaved curvy surface or multiple protruded bulks are facing each other with a distance without touching; a distance of all tips of each concaved curvy surface or multiple protruded bulks facing each other gradually decreases from top to bottom; and at a bottom of the impregnation section channel is connected to the melt tank control section with a control section channel; the control section channel exhibits a gradual decreased tapered shape; and the melt tank fibre discharging port is disposed at a bottom of the control section channel.

As above description, the present invention has beneficial effects and advantages as following.

1. The extrusion equipment of the present invention is deposited in a working direction vertically along with gravity, which can reduce the abnormal friction of the processed fibre and from each component of the extrusion equipment in order to avoid any potential breakage of the fibre and improve the impregnation quality. The resin melt is designed to be processed traveling along with the gravity during impregnating the fibre which could allow the remaining resin melt to be successfully evacuated from the extrusion equipment to avoid decomposition because of the high heat and the long retention time in the cavity.
2. Furthermore, by incorporating the soft rubber wheels maintaining the decompression section in a vacuum condition preventing any air from entering, the present invention could produce the fibre prepreg with less air bubbles in high quality. The impregnation section channel has the gradual decreased passage using the concaved curvy surface or protruded bulks which can decrease a scale of slow resin melt flow region and increase a scale of high resin melt flow region to facilitate the evacuation of the remaining resin melt.
3. The present invention can be modularized to control the impregnation status of the fibre prepreg and have the finished product with adjustable shape by using different melt tank fibre discharging port with circular line opening or sheet opening, etc. The size of the melt tank fibre discharging port can be adjusted for effectively control the resin content (RC %) of the resin impregnated of the fibre so that the present invention can adapt achieve the interface control of the extrusion equipment by adjusting the equipment settings according to the processing requirements and the flexible production purpose.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

Extrusion Equipment

Figure 1:
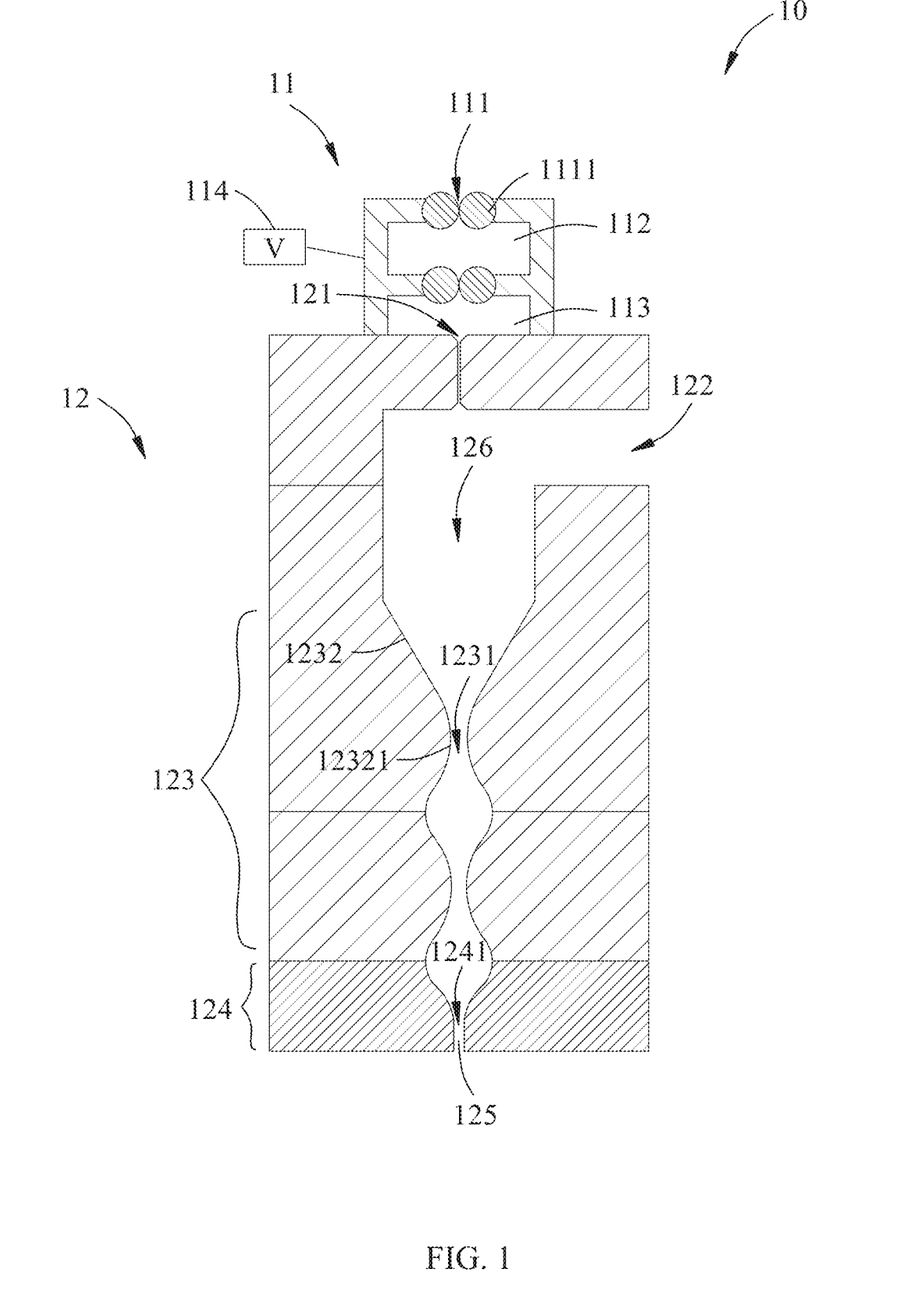
FIG. 1 is a dissection view for illustrating a preferred embodiment of the extrusion equipment in accordance with the present invention.

With reference to FIG. 1, a preferred embodiment of an extrusion equipment 10 provided by the present invention includes a decompression section 11 and a melt tank 12 arranged in a vertical direction along with gravity.

The decompression section 11 as shown in FIG. 1 comprises a decompression section feeding port 111 at top and a decompression section discharging port 113 on a bottom. A decompression cavity 112 is defined between the decompression feeding port 111 and the decompression section discharging port 113. The decompression cavity 112 is connected with a vacuum device 114 creating vacuum environment within such cavity. At least a pair of soft rubber wheels 1111 (two pairs are shown in this preferred embodiment in FIG. 1) that allowing to rotate freely are provided at an opening of the decompression section feeding port 111 of the decompression section 11. When the soft rubber wheels 1111 push against each other, the decompression section feeding port 111 will be closed entirely and making the decompression cavity 112 maintaining in vacuum environment or close to vacuum environment with atmosphere less than or close to 1 atmosphere (0-760 mmHg). By such approaches, the decompression section 11 can reduce outside air entering the extrusion equipment 10 for reducing or minimizing any defect from air bubbles in following finished product.

The melt tank 12 is following connected below the decompression discharging port 113 of the decompression section 11. The melt tank 12 includes a melt tank fibre feeding port 121, a melt tank resin feeding port 122, a melt tank impregnation section 123, a melt tank control section 124, a melt tank fibre discharging port 125, and a melt tank cavity 126 defined by all the aforementioned components.

The melt tank fibre feeding port 121 is immediately followed with the decompression section discharge port 113 at bottom. The melt tank resin feeding port 122 is arranged at a lateral portion of the melt tank cavity 126 as an opening and is located below the melt tank fibre feeding port 121 but above the melt tank impregnation section 123. The melt tank impregnation section 123 in this preferred embodiment as shown in FIG. 1, it includes an impregnation section channel 1231 extending in a vertical direction arranging with two sides of concaved curvy surfaces 1232. All tips 12321 of the concaved curvy surface 1232 are facing each other with a proper distance without touching. The distance between each corresponded tip 12321 of the facing concaved curvy surface 1232 from two sides is gradually decreased from top to bottom to form the impregnation section channel 1231.

Figure 2:
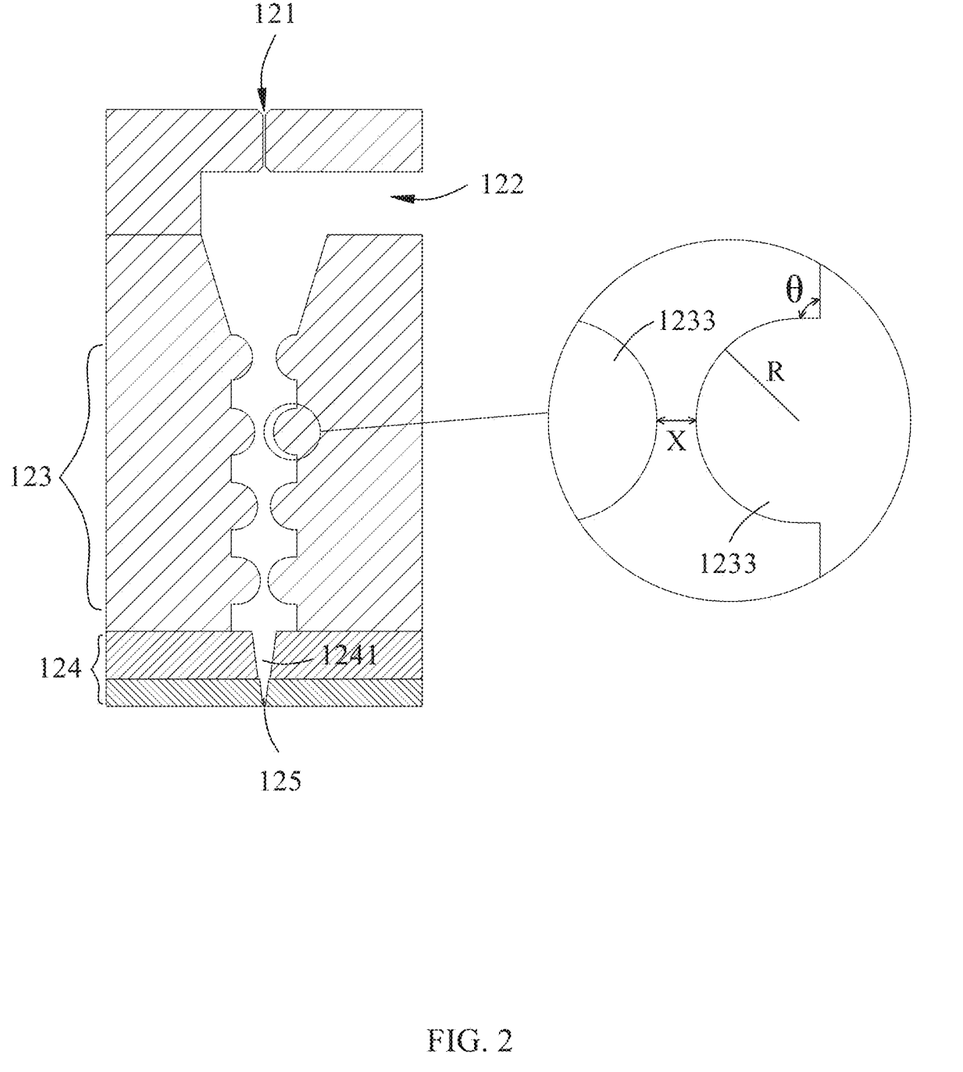
FIG. 2 is a dissection view for illustrating another preferred embodiment of the extrusion equipment in accordance with the present invention.
Figure 7A:
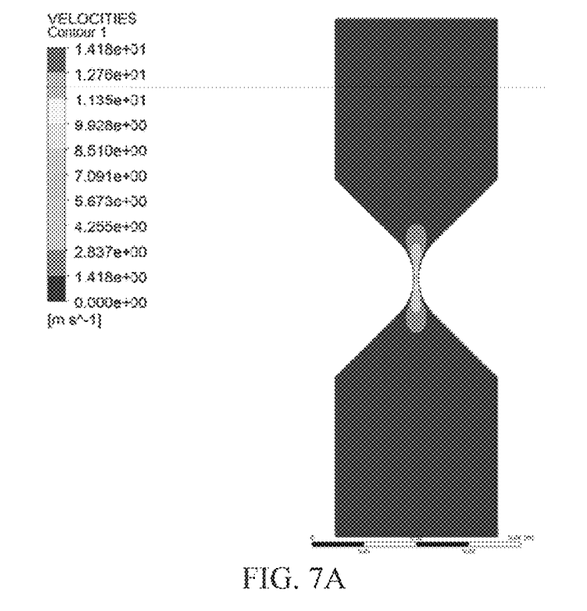
FIG. 7A, FIG. 7B, FIG. 8A and FIG. 8B are simulation FIGS. demonstrating the resin melt impregnated the fibre using the extrusion equipment in accordance with the present invention.
Figure 7B:
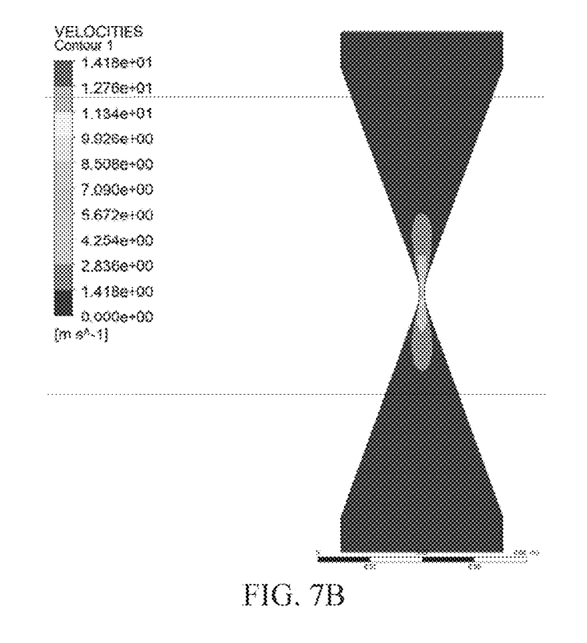

With reference to FIG. 2, another preferred embodiment of the concaved curvy surface 1232 on the surface of the melt tank impregnation section 123 comprises multiple protruded bulks 1233 facing to each other from two sides to form the impregnation section channel 1231 extending in the vertical direction. Similar to the previous embodiment, a distance x of a tip of each protruded bulk 1231 facing each other gradually decreases from top to bottom. This structure promotes an impregnation ability of the melt and also prevents the breakage of the fibre. A preferred embodiment of the protruded bulk 1233 can be formed on the surface of the melt tank impregnation section 123 in the form of semicircles or partial spheres, and the semicircles or partial spheres preferably have a sphere radius R between 1-100 mm or more preferably, 3-100 nm. The protruded bulk 1233 and the surface of the melt tank impregnation section 123 are defined with an included angle θ, which is preferably between 90° and 180°, and more preferably, the included angle θ is between 140° and 180°. As shown in FIG. 7A (a simulation of the resin melt flow rate under the condition of θ=120° and FIG. 7B (the other simulation of the resin melt flow rate under the condition of θ=150° show that with the included angle θ increased, a high flow rate region of the resin melt can be increased, which is helpful for the resin melt to evacuate from the melt tank cavity 126.

Figure 8A:
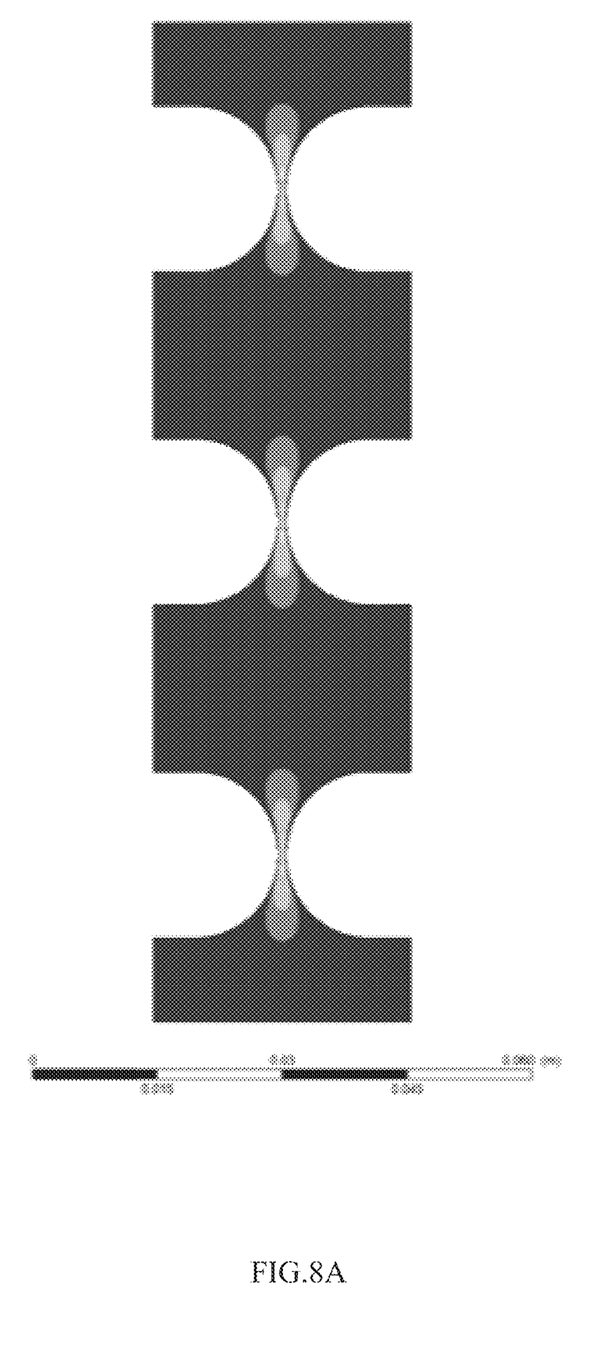
Figure 8B:
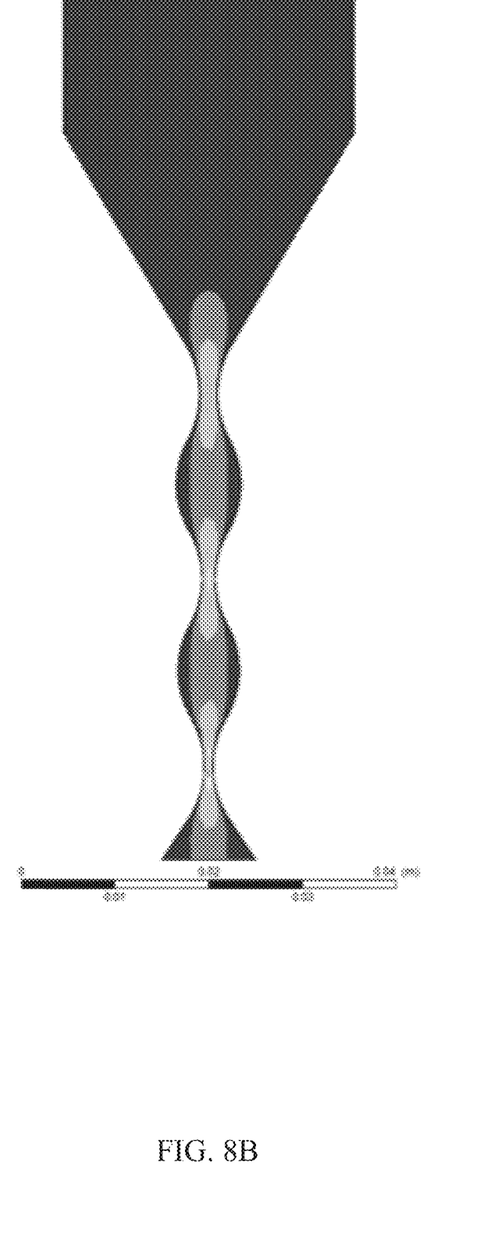

Further, another two simulations of resin melt flow rate are shown in FIG. 8A and FIG. 8B using two embodiments of the melt tank impregnation section 123 in ladder-like structure and teardrop-like structure with gradual decreased distance x of the impregnation section channel 1231 allowing the resin melt to have more high flow rate region. This also means that a low flow rate region can be avoid or greatly decreased helping the resin melt be evacuated from the melt tank cavity 126 efficiently.

Figure 9:
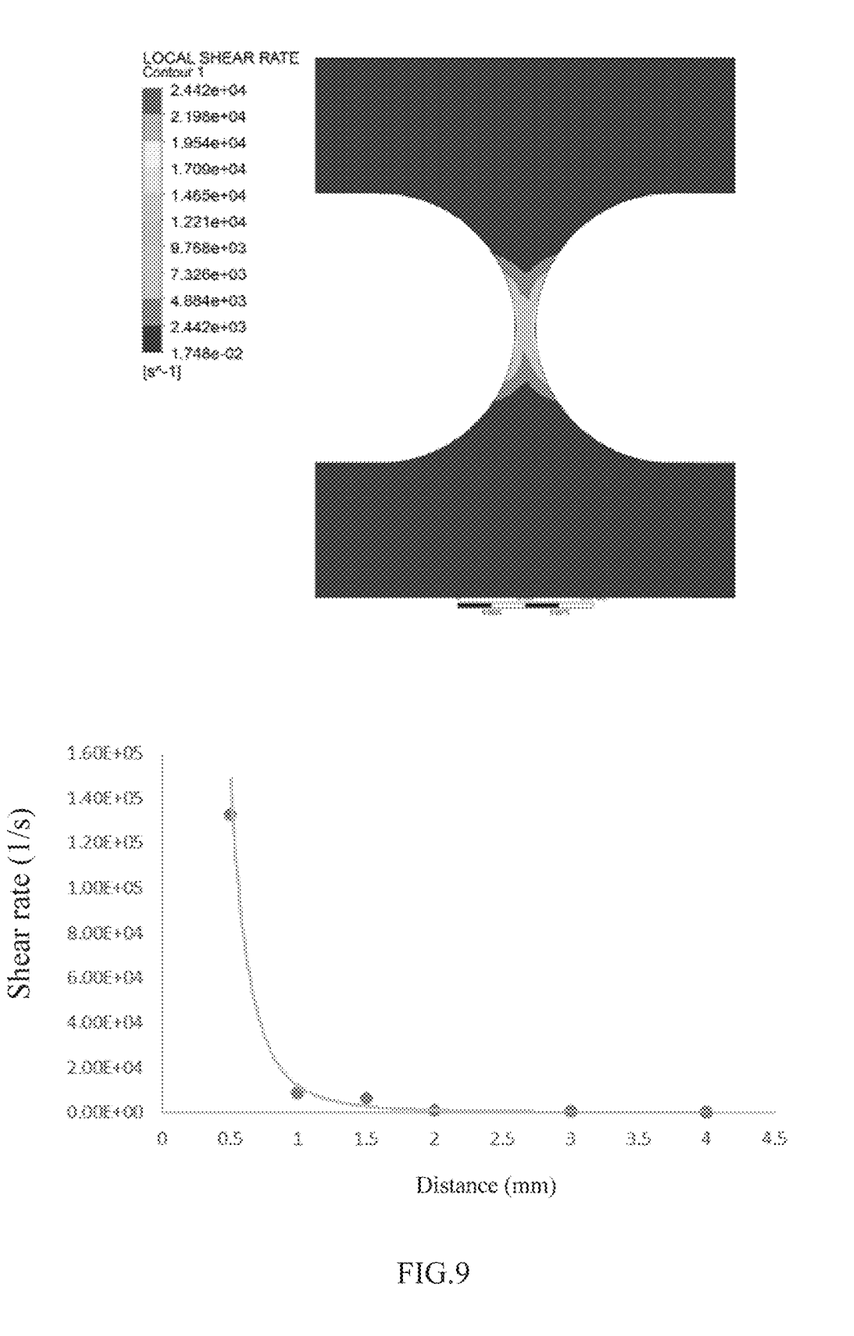
FIG. 9 is a simulation result of shearing force of the resin melt impregnated the fibre using the extrusion equipment in accordance with the present invention.
Figure 10A:
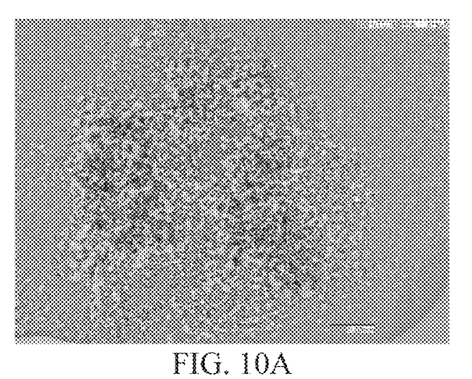
FIG. 10A, FIG. 10B and FIG. 10C are optical microscope section diagrams of impregnated fibre by three different distances of melt tank impregnation section in accordance with the present invention.
Figure 10B:
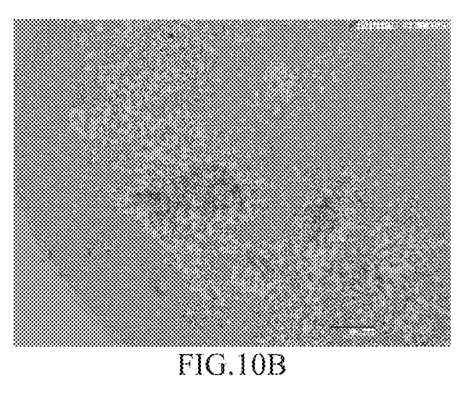
Figure 10C:
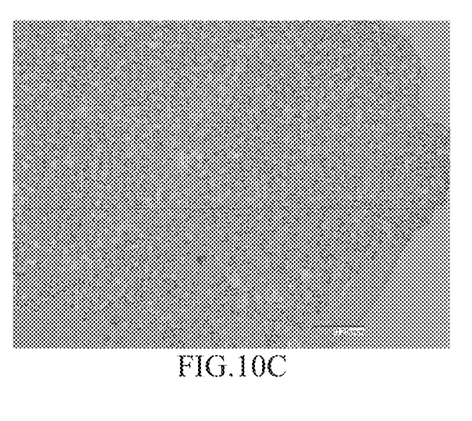

Further, with reference to FIG. 9, a series of shear rate simulation using Polyphenylene sulfide (PPS) resin melt in a condition of volume flow rate Q=10 $cm^3$/s is presented with protruded bulk 1233 forming the impregnation section channel 1231 with the tips of the protruded bulk 1233 has the distance x at a range from 0.5 mm to 4 mm. As shown in FIG. 9, as the distance x is greater than 3 mm, the resin melt does not have the ability to properly impregnate into the fibre resulting in decreasing of dispersibility. However, when the distance x decreased to less than 0.5 mm, the shear rate of the resin melt-enhanced rapidly, and the fibre will be torn and terminate the operation. Therefore, it is preferred to have the distance x being settled in a range of 0.5 mm-3 mm, or more preferably 1 mm-3 mm for the most promising impregnating result for the resin melt and the fibre. With reference to FIG. 10A and FIG. 10B, three different results of optical microscope section diagrams of impregnated fibre by three different distance x of 3 mm, 2 mm and 1 mm are presented respectively. As shown in these three figures, the present invention can achieve different impregnation effects of fibre dispersion by adjusting the distance x. As shown in the figures, the fibre presented as black or darker color than the resin is because these two materials share different light conductivity. When the distance x decreases from 3 mm to 1 mm, the fibre shows tremendous disperse ability within the resin.

Figure 3:
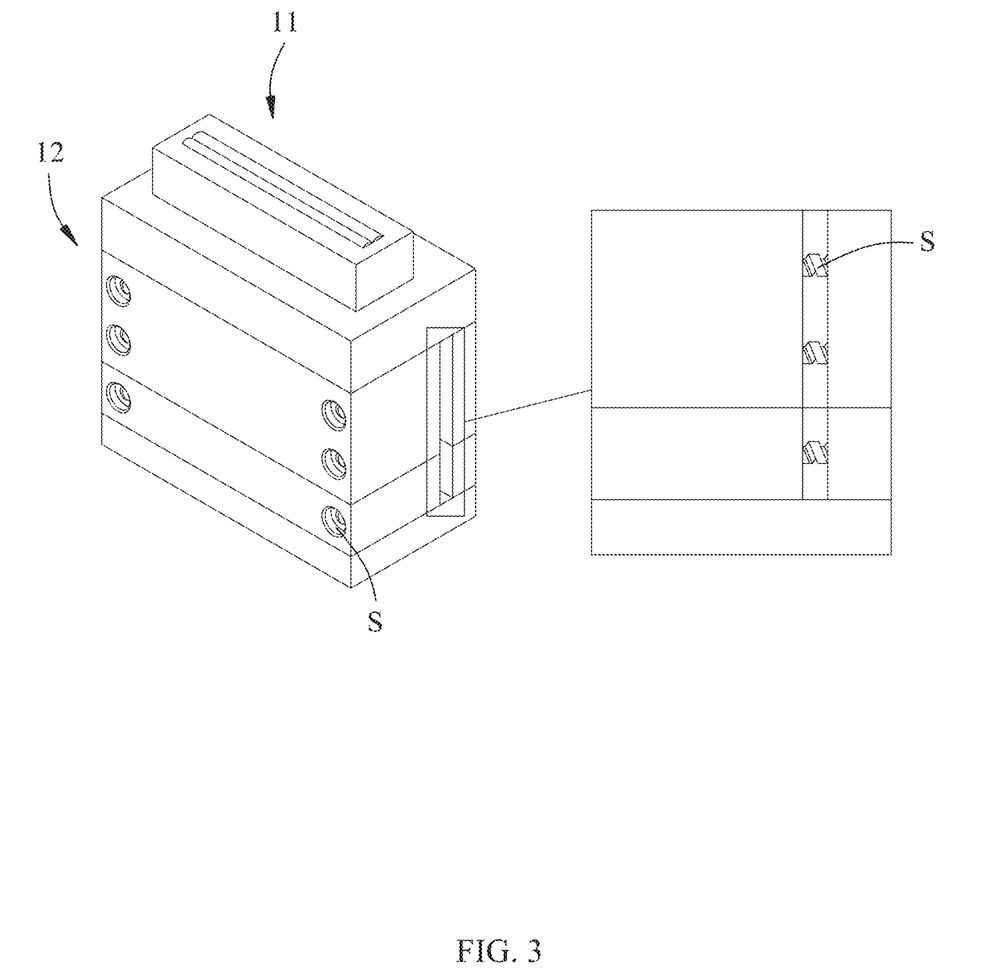
FIG. 3 is a dissection view for illustrating a partial part of the melt tank impregnation section in accordance with the present invention.

With reference in FIG. 3, as different distance x could achieve different processing results to the resin melt, a bolt S or a motor can be used between the corresponding concaved curvy surfaces 1232 or the protruded bulks 1233 clamping form left and right to achieve the adjustable distance x. This could benefit the present invention suitable for processing different resin melt with different flow rate pattern, abilities or even rheological properties within the impregnation section channel 1231. The bolt S or a motor can be controlled by computerized programs for fulfilling fine-tuning the distance x and achieving a purpose of complete machine interface control and intelligent flexible production. Preferably, the distance of the impregnation section channel 1231 between the concaved curvy surface 1232 or the protruded bulk 1233 is between 0.5 mm-3 mm, and more preferably 1 mm-3 mm to achieve the optimum impregnation processing effect.

At a bottom or an end of the impregnation section channel 1231 is connected to the melt tank control section 124. The melt tank control section 124 can be presented as a control section channel 1241 (as shown in FIG. 2) that exhibits a gradual decreased tapered shape. It can also contain the concaved curvy surface similar to the impregnation section channel 1231 (as shown in FIG. 1) extending in a vertical direction. The melt tank fibre discharging port 125 is disposed at a bottom or an end of the control section channel 1241.

Figures 4A, 4B:
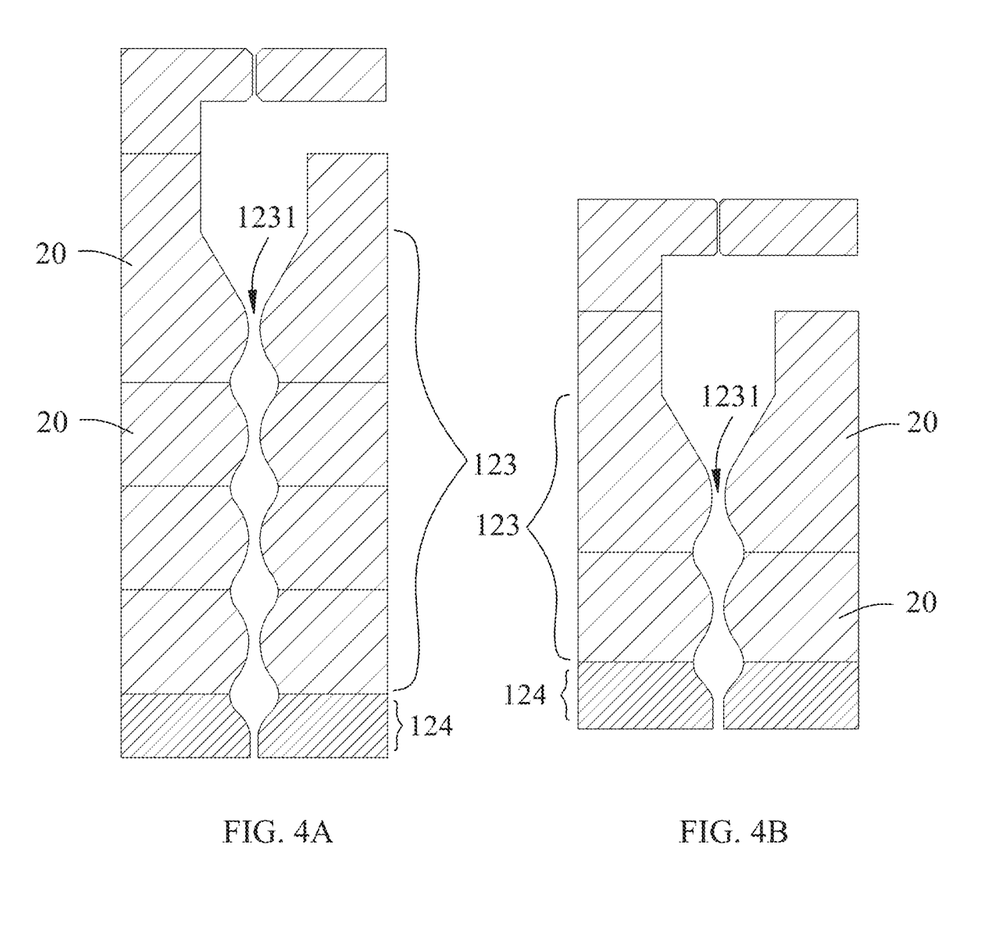
FIG. 4A and FIG. 4B are two illustration figures of modularized melt tank in accordance with the present invention.

With reference to FIG. 4A and FIG. 4B, to achieve a more flexible processing result, the present invention can be modularized and assembly into multiple module pieces 20 within the melt tank 12. The extrusion equipment 10 of the present invention is adjusted adaptively according to processing requirements from the setting and arrangement of the module pieces 20. An amount or number of the module piece 20 is related to the flow rate ability and how fluidity of the processed resin melt. The number of the module piece 20 can be reduced to have a shorter passage channel when the resin melt having better fluidity. On the contrary, the number of the module piece 20 can be increased to have a longer passage channel for processing the resin melt having poorer fluidity. For example, as shown in FIG. 4A, when the processed resin melt has a melt index (MI)<10 with poorer fluidity, it is preferable to use four (pairs) or more module piece 20 to make the passage channel longer for the processed resin melt highly or perfectly impregnated the fibre in desired status. When the melt index (MI)>30 with greater fluidity, less module piece 20, for example 2 (pairs) as shown in FIG. 4B can complete the impregnation perfectly. Also, the modularized structure using multiple pairs of the module piece 20 could achieve the requirement of gradually decreased distance impregnation section channel 1231 of the melt tank impregnation section 123.

Manufacture or Use Method of Extrusion Equipment

Figure 5:
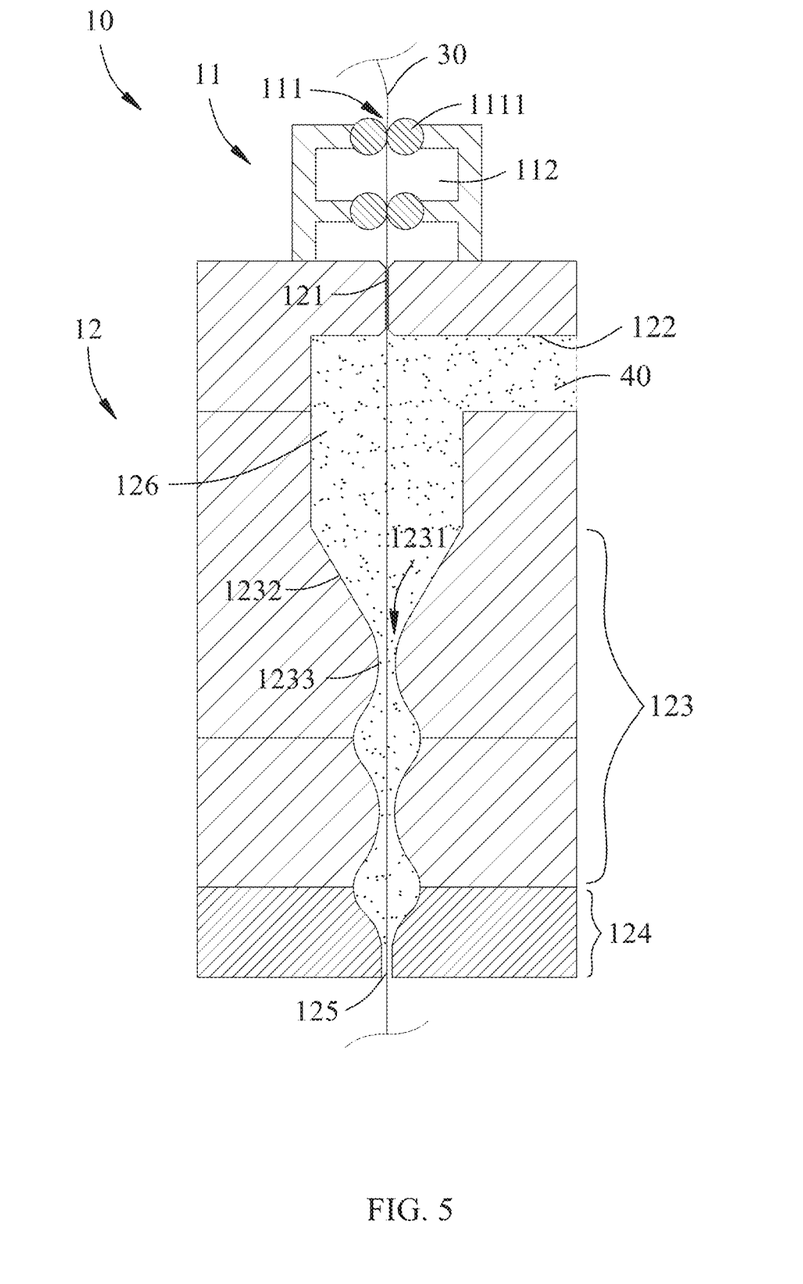
FIG. 5 is an illustration figure showing processing steps of the extrusion equipment in accordance with the present invention.

With reference to FIG. 5, the extrusion equipment 10 provided by the present invention is mainly used for impregnating fibre with the resin melt which called fibre-resin impregnation process making fibre prepreg. In this embodiment, the process begins with a long or continuous fibre 30 being fed into the extrusion equipment 10 of the present invention. However, the long or continuous fibre 30 is just a preferred embodiment for better description or understand. Any fibre form such as organic or inorganic fibre and continuous or incontinuous fibre are all suitable for the present invention. It is worth to be noticed that the processing temperature should be carefully controlled when using organic fibre with different melting point and decomposition ability during process. Some preferred organic fibre that could be processed by the present invention contains ultrahigh molecular weight polyethylene fibre, polyparaphenylene benzobisoxazole (PBO) fibre, Kevlar® fibre, polybenzimidazole (PBI) fibre, polyimide (Pt) fibre and commonly used chemical fibre. The preferred inorganic fibre includes reinforced fibre such as carbon fibre or glass fibre. The continuous fibre 30 is fed into the decompression section 11 from the soft rubber wheels 1111 of the decompression section feeding port 111. The soft rubber wheels 1111 is responded as rotating by a fiction causing by the inputting continuous fibre 30. The continuous fibre 30 will be fall into the soft rubber wheels 1111 under a clamping force from the said wheels 1111. The decompression cavity 112 is remained in vacuum condition (with the atmosphere at the range of 0 mmHg to 760 mmHg) by closed clamping soft rubber wheels 1111 which could reduce the air entering and prevent the impregnated quality from air bubbles generated during the processing of resin impregnation.

The continuous fibre 30 enters the melt tank 12 from the melt tank fibre feeding port 121 vertically along the direction of gravity, and simultaneously a resin 40 is fed by the melt tank resin feeding port 122 into the melt tank cavity 126. The melt tank 12 is preferred to implement with a heating system keeping the resin 40 being melted as a melt between 50 to 450° C. to prevent the resin 40 from solidifying. Preferably, the resin 40 that can be used in the present invention is a thermoplastic resin, or more preferably a high-temperature engineering thermoplastic resin. Such thermoplastic resin could be but not limited to polypropylene (PP), polyethylene (PE), polyamide (PA, including PA6 or PA66), polycarbonate (PC), thermoplastic polyurethane (TPU), polyetheretherketone (PEEK), polyphenylene sulfide (Poly (Phenylene sulfide, PPS), Polyphthalamide (Polyphthalamide, PPA), Polyetherimide (Polyetherimide, PEI), etc.

While the continuous fibre 30 contacts the resin 40 melt, both materials enter the melt tank impregnation section 123 together along with the direction of gravity and pass through the impregnation section channel 1231 formed by the concaved curvy surface 1232 or a plurality of the protruded bulks 1233. The continuous fibre 30 and the resin 40 melt are interposed and impregnated with shear force while both materials travel through the channel 1231, which promotes the impregnating of the resin 40 melt into the continuous fibre 30 and achieves the effect that the resin 40 melt is evenly distributed into the continuous fibre 30.

The continuous fibre 30 which is impregnated with the resin 40 melt reaches the melt tank control section 124 along with the direction of gravity and are discharged from the melt tank fibre discharging port 125. Preferably, a shape of the melt tank fibre discharging port 125 can have different outlet shapes, for example in a circular linear opening or a sheet opening for allowing a shape of the finished product in a desired linear or sheet condition. Meanwhile, a size of the melt tank fibre discharging port 125 can also be adjusted for effectively controlling a resin content ratio (RC %, RC ratio) of the continuous fibre 30 impregnated by the resin 40 melt.

Figure 6:
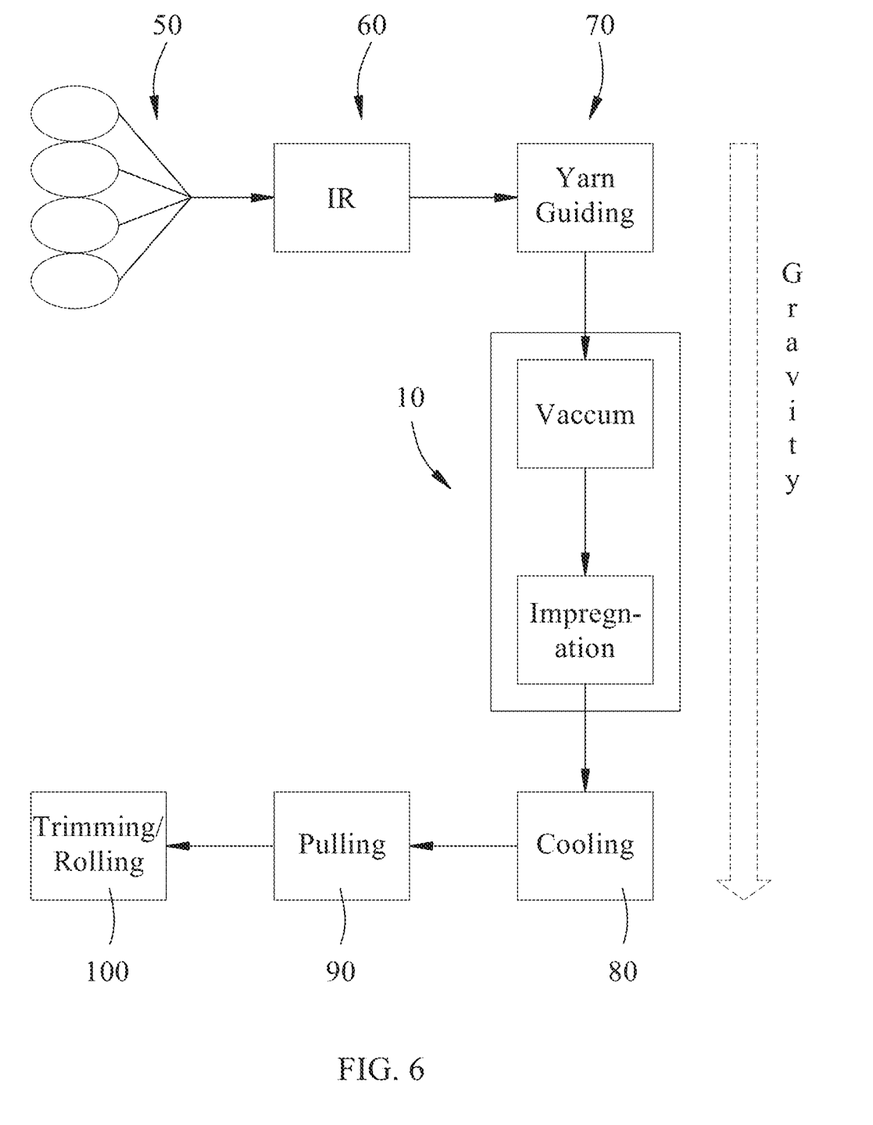
FIG. 6 is an illustration figure showing processing steps of the extrusion equipment with other suitable equipment in accordance with the present invention.

With reference to a flow chart in FIG. 6, preferably the continuous fibre 30 is drawn from a yarn rack 50 and is optionally spread through a thermally assisted device (like infrared, IR) or yarn spreading assistance device 60. The spread continuous fibre 30 is introduced into the extrusion equipment 10 of the present invention by a yarn guiding device 70 for impregnation processing. Finally, the impregnated finished product is output from the extrusion equipment 10 of the present invention and then cooled by a cooling device 80 for further trimming or rolling step 100. In the processing flow provided in FIG. 6, the extrusion equipment 10 of the present invention remaining its processing direction vertically along with the gravity which can reduce the abnormal friction on the continuous fibre 30 and avoid its breakage. The melt of the resin 40 flows downwardly due to the influence of gravity, to avoid being deposited in the melt tank 12 for a long time to cause any decomposition. The modularized cavity structure provided by the present invention enables the fibre 30 and the resin 40 melt effectively impregnation.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. An extrusion equipment, for processing a fibre, comprising a decompression section and a melt tank arranged in a vertical direction along with gravity, wherein:
   the decompression section comprises a decompression section feeding port at top and a decompression section discharging port on a bottom; a decompression cavity is defined between the decompression section feeding port and the decompression section discharging port; the decompression cavity is connected with a vacuum device; at least a pair of rubber wheels is provided at an opening of the decompression section feeding port;
   the melt tank is connected below the decompression section discharging port; the melt tank includes a melt tank fibre feeding port, a melt tank resin feeding port, a melt tank impregnation section, a melt tank control section, a melt tank fibre discharging port, and a melt tank cavity defined at least by the melt tank control section and the melt tank impregnation section, the melt tank cavity in fluid connection with the metal tank resin feeding port, the metal tank resin feeding port, and the melt tank fibre discharging port; wherein:
   the decompression section discharge port is followed by the melt tank fibre feeding port, the melt tank resin feeding port is arranged at a lateral portion of the melt tank as an opening and is located below the melt tank fibre feeding port above the melt tank impregnation section; the melt tank is applied to feed a thermoplastic resin via melt tank resin feeding port;
   the melt tank impregnation section includes an impregnation section channel extending in a vertical direction arranging with two sides of concaved curvy surfaces or multiple protruded bulks; all tips of the concaved curvy surface or multiple protruded bulks are facing each other with a distance without touching; a distance of all tips of each concaved curvy surface or multiple protruded bulks facing each other gradually decreases from top to bottom; and
   at a bottom of the impregnation section channel is connected to the melt tank control section with a control section channel; the control section channel exhibits a gradual decreased tapered shape; and the melt tank fibre discharging port is disposed at a bottom of the control section channel.

2. The equipment as claimed in claim 1, wherein: an atmosphere of the decompression cavity is at a range of 0 to 760 mmHg; and the melt tank is connected with a heating system keeping a temperature of the melt tank at a range of 50 to 450° C.

3. The equipment as claimed in claim 1, wherein: a shape of the melt tank fibre discharging port comprises a circular linear opening or a sheet opening with adjustable size.

4. The equipment as claimed in claim 1, wherein: the protruded bulk is formed on a surface of the melt tank impregnation section in a form of semicircles or partial spheres with sphere radius R between 1-100 mm.

5. The equipment as claimed in claim 1, wherein: the protruded bulk is formed on a surface of the melt tank impregnation section in a form of semicircles or partial spheres with sphere radius R between 3-100 mm.

6. The equipment as claimed in claim 1, wherein: the protruded bulk and the surface of the melt tank impregnation section are defined with an included angle at a range of 90° to 180°.

7. The equipment as claimed in claim 1, wherein: a bolt or a motor is used between the corresponding concaved curvy surfaces or the protruded bulks clamping form left and right to achieve the adjustable distance within 0.5-3 mm.

8. The equipment as claimed in claim 1, wherein: a bolt or a motor is used between the corresponding concaved curvy surfaces or the protruded bulks clamping form left and right to achieve the adjustable distance within 1-3 mm.

9. The equipment as claimed in claim 1, wherein: a yarn rack, a heat assistance device, a yarn spread device or a yarn guiding device is connected ahead of the extrusion equipment.

10. The equipment as claimed in claim 1, wherein: a cooling device, a trimming device or a rolling device is connected behind of the extrusion equipment.

* * * * *